J. M. SMITH.
RAIL JOINT AND FASTENING.
APPLICATION FILED APR. 19, 1916.
1,192,008.
Patented July 25, 1916.
2 SHEETS—SHEET 1.
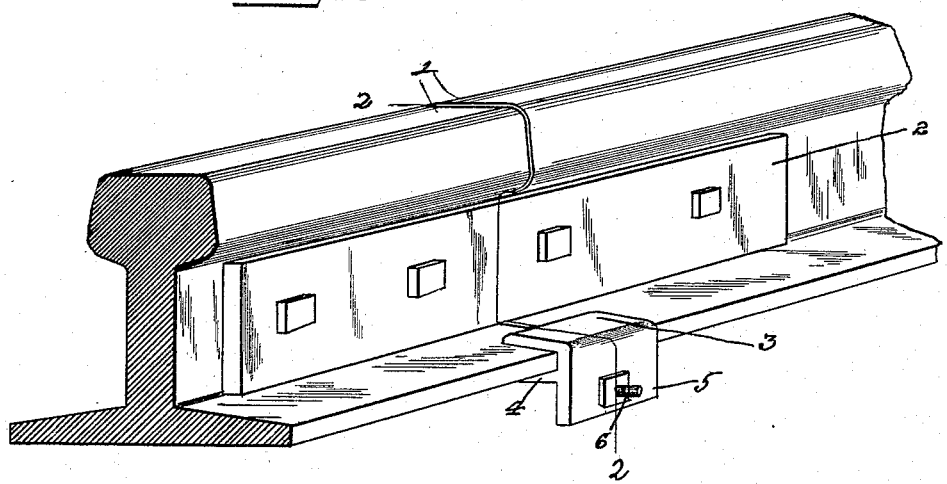
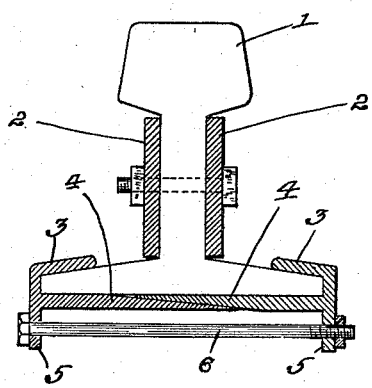
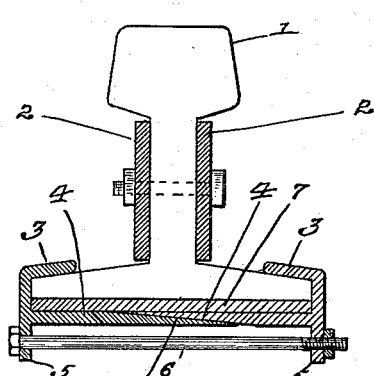
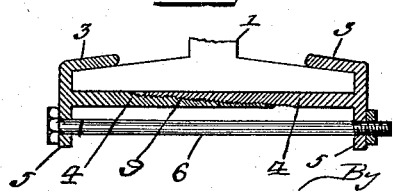
Witnesses
Ira M. Jones
M. E. Moore
Jabez M. Smith
Inventor
By
Attorney J. M. SMITH.
RAIL JOINT AND FASTENING.
APPLICATION FILED APR. 19, 1916.
1,192,008.
Patented July 25, 1916.
2 SHEETS—SHEET 2.
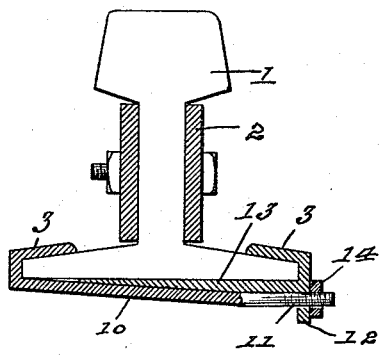
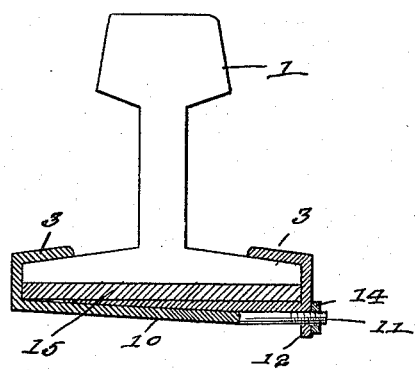
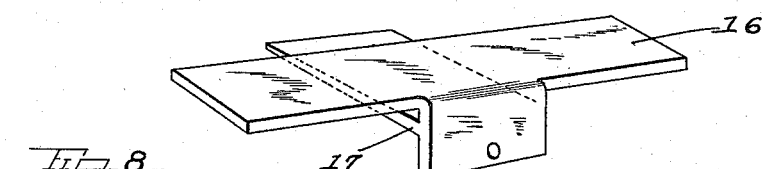
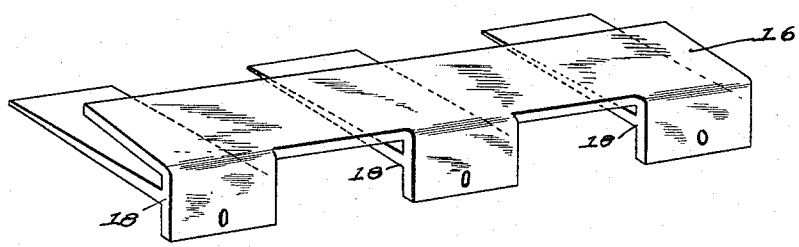
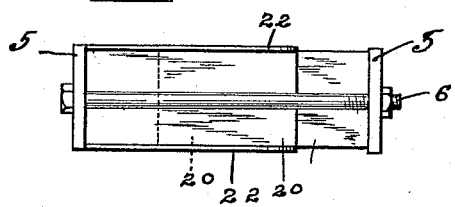
Witnesses
Ira M. Jones.
M. E. Moore
Jabez M. Smith
Inventor
By 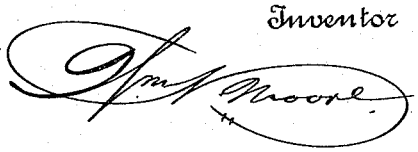
Attorney

UNITED STATES PATENT OFFICE.

JABEZ M. SMITH, OF MALVERN, ARKANSAS.

RAIL JOINT AND FASTENING.

1,192,008. Specification of Letters Patent. Patented July 25, 1916.

Application filed April 19, 1916. Serial No. 92,100.

*To all whom it may concern:*

Be it known that I, JABEZ M. SMITH, a citizen of the United States, residing at Malvern, in the county of Hot Spring and State of Arkansas, have invented certain new and useful Improvements in Rail Joints and Fastenings, of which the following is a specification.

My invention relates to improvements in rail joints and fastenings, and one object is the provision of a structure capable of use in connection with rails where fish plates are employed, or which can be used when the fish plates are absent, and which will perform its functions perfectly under either condition.

Another object of my invention is the provision of a structure which can be easily applied and removed when necessary, which will secure the ends of the rails in proper relation, and which will allow for the usual contraction and expansion due to weather conditions.

Another object of my invention is the provision of a rail joint and fastening which will be of the most simple and inexpensive construction, which will be very durable to insure a long life and which from every point of view will prove thoroughly efficient and practical.

With these objects in view my invention consists of a rail joint and fastening embodying novel features of construction and combination of parts for service as hereinafter disclosed, it being understood that any changes may be made which come within the scope of my invention.

Figure 1 represents a perspective view of the meeting ends of the rails with fish plates and my improvement in position for use in connection with the rails and fish plates. Fig. 2 represents a view on the line 2—2 of Fig. 1. Fig. 3 represents a transverse sectional view of a modified construction of my invention. Fig. 4 represents a transverse sectional view of another modified construction of my invention. Figs. 5 and 6 represent transverse sectional views of another modified construction of my improvement. Figs. 7 and 8 represent perspective views of a still further modification of my structure, and Fig. 9 represents a bottom plan view of another form of my invention.

Referring by numeral to the drawings, in which similar characters denote the same parts in all the views: the numeral 1 designates the meeting ends of the rails which ends may or may not be connected by the usual fish plates 2, and my improvement may be said to consist of twin or like members, each having a portion 3 engaging the foot of the rail, and an inward extending wedge shaped arm 4, and a vertical flange 5, said members being clamped upon the foot of the rail and wedged together by means of the clamping rod 6, passing through said flanges 5. From this construction it will be observed that when the parts are assembled the portions 3 engage the upper side of the foot of the rail and the wedge shaped arms fit together and engage the under face of the foot of the rail, the clamping rod securing the two members in proper position upon the foot of the rail.

In the form of my invention shown in Fig. 3 the foot of the rail is supported upon the flat plate 7, and in this case the arms form the bed or support for said plate while in Fig. 4 the inclined or opposing wedge shaped faces 8 are formed with serrations or teeth 9 which engage and retain the arms in clamped relation.

In the form of my invention shown in Figs. 5 and 6 one member 10 is formed with a screw threaded end 11 passing through the flange 12 of the other member 13 and secured in proper relation thereto by means of the clamping nut 14, the supporting plate 15 being shown in Fig. 6.

In the form of my invention shown in Fig. 7 which is adapted for jointing and fastening the ends of the rails where no fish plates are used the elongated foot engaging portion 16, is employed with only a single clamping structure 17, while in Fig. 8 the elongated foot engaging portion is used and a series of clamping devices 18 are used, while in the form shown in Fig. 9 I employ the wedge shaped arms 20, one of which is formed with guides or cleats 22, which serve to retain the wedge shaped arms in proper relation.

From the foregoing description taken in connection with the drawings the manner of using my improvement will be readily apparent, and it will be noted that the ends of the rails may be secured by my device either with or without fish plates, also that the structure will prove efficient, desirable and practical in every respect.

It will be understood that my joint and fastening may be used in connection with the angled shaped fish plates as well as with the flat or vertical plates, and operate effectively and practically.

I claim:—

1. A rail joint and fastening, consisting of twin members, each having a portion engaging the upper face of the foot of the rail, an inward extending arm and a vertical flange, and a clamping device for securing the members to provide a support and fastening for the rails, said arms having their opposing faces inclined to form co-acting wedges and having engaging teeth.

2. A rail joint and fastening, consisting of twin members, each having an elongated portion engaging the upper face of the foot of the rail, a series of inward extending wedge shaped arms, vertical flanges integral with the wedge shaped arms, openings in said vertical flanges, and clamping rods passing through said openings for clamping the twin members about the meeting ends of the rails.

3. A rail joint and fastening consisting of twin members, each having a portion engaging the upper face of the foot of the rail, an inward extending wedge shaped arm and an integral vertical flange having an opening therein, and a clamping rod passing through said opening, the wedge shaped arm of one of said twin members being formed on either side with guides which serve to retain the wedge shaped arms in proper position.

In testimony whereof I affix my signature in the presence of two witnesses.

JABEZ M. SMITH.

Witnesses:
J. W. PENNINGTON,
S. D. O'BRIEN.

Copies of this patent may be obtained for five cents each, by addressing the "Commissioner of Patents, Washington, D. C."